US010917205B2

(12) United States Patent
Kim et al.

(10) Patent No.: US 10,917,205 B2
(45) Date of Patent: Feb. 9, 2021

(54) METHOD AND DEVICE FOR TRANSMITTING OR RECEIVING SIGNAL BY USING CARRIER AGGREGATION IN WIRELESS COMMUNICATION SYSTEM

(71) Applicant: LG Electronics Inc., Seoul (KR)

(72) Inventors: Jaehyung Kim, Seoul (KR); Seonwook Kim, Seoul (KR); Changhwan Park, Seoul (KR); Hanjun Park, Seoul (KR); Joonkui Ahn, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/814,002

(22) Filed: Mar. 10, 2020

(65) Prior Publication Data

US 2020/0235871 A1 Jul. 23, 2020

Related U.S. Application Data

(63) Continuation of application No. PCT/KR2018/010575, filed on Sep. 10, 2018.

(60) Provisional application No. 62/556,503, filed on Sep. 10, 2017.

(51) Int. Cl.
*H04L 5/00* (2006.01)
*H04W 56/00* (2009.01)
*H04W 72/04* (2009.01)

(52) U.S. Cl.
CPC .......... *H04L 5/001* (2013.01); *H04W 56/0005* (2013.01); *H04W 56/0045* (2013.01); *H04W 72/0413* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2014/0293896 | A1* | 10/2014 | Kuo | H04L 5/0053 370/329 |
| 2015/0327198 | A1 | 11/2015 | Axmon et al. | |
| 2018/0324850 | A1* | 11/2018 | Amuru | H04L 5/0053 |
| 2018/0352527 | A1* | 12/2018 | Wang | H04L 1/1812 |
| 2018/0359149 | A1* | 12/2018 | Shaheen | H04W 72/0453 |
| 2018/0368114 | A1* | 12/2018 | Chen | H04W 24/10 |
| 2019/0053182 | A1* | 2/2019 | Choi | H04W 72/0453 |
| 2019/0053228 | A1* | 2/2019 | Akkarakaran | H04W 72/0446 |

OTHER PUBLICATIONS

Ericsson, "On timing advance," R1-1714452, Prague, Czech Republic, dated Aug. 21-25, 2017, 2 pages.

(Continued)

*Primary Examiner* — Hassan A Phillips
*Assistant Examiner* — Gautam Sharma
(74) *Attorney, Agent, or Firm* — Fish & Richardson P.C.

(57) ABSTRACT

Disclosed is a method for transmitting, by a user equipment, an uplink signal using carrier aggregation in a wireless communication system. More specifically, the method includes transmitting a first uplink signal to a base station on a first component carrier included in a first timing advance group (TAG); and transmitting a second uplink signal to the base station on a second component carrier included in a second TAG.

14 Claims, 11 Drawing Sheets

(b) Multiple CC

(56) References Cited

OTHER PUBLICATIONS

Huawei, HiSilicon, "On NR carrier aggregation," R1-1712160, 3GPP TSG RAN WG1 Meeting #90, Prague, Czech Republic, dated Aug. 21-25, 2017, 11 pages.
Huawei, HiSilicon, "Overview of NR UL for LTE-NR coexistence," R1-1709383, 3GPP TSG RAN WG1 Meeting #89, Hangzhou, China, dated May 15-19, 2017, 15 pages.
LG Electronics, "Support of DL/UL control/signal transmission for NR CA," R1-1713203, 3GPP TSG RAN WG1 Meeting #90, Prague, Czech Republic, dated Aug. 21-25, 2017, 8 pages.
Samsung, "Multi-TA procedures for Multi-TRP," R1-1713581, 3GPP TSG RAN WG1 Meeting #90, Prague, Czech Republic, dated Aug. 21-25, 2017, 4 pages.
Ericsson, "Introduction of Band 66," R4-157791, 3GPP TSG-RAN WG4 Meeting #77, Anaheim, CA, US, Nov. 16-20, 2015, 510 pages.
Extended European Search Report in European Appln. No. 18853140.4, dated Oct. 13, 2020, 12 pages.
NTT Docomo, Inc., "Scheduling/HARQ aspects for carrier aggregation," R1-1713963, 3GPP TSG RAN WG1 Meeting #90, Prague, Czechia, Aug. 21-25, 2017, 3 pages.

\* cited by examiner (a) Single CC (b) Multiple CC

☐ F1   ▨ F2

METHOD AND DEVICE FOR TRANSMITTING OR RECEIVING SIGNAL BY USING CARRIER AGGREGATION IN WIRELESS COMMUNICATION SYSTEM

CROSS-REFERENCE TO RELATED APPLICATIONS

Pursuant to 35 U.S.C. § 119(e), this application is a continuation of International Application No. PCT/KR2018/010575, filed on Sep. 10, 2018, which claims the benefit of U.S. Provisional Application No. 62/556,503, filed on Sep. 10, 2017, the contents of which are all hereby incorporated by reference herein in their entirety.

TECHNICAL FIELD

The present disclosure relates to a wireless communication system, and more particularly to a method for transmitting and receiving a signal using carrier aggregation (CA) and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

The present disclosure proposes a method of determining various requirements, TA granularity, a TA maximum value, etc. for supporting a timing advance (TA) or multiple TAs in a new radio (NR) carrier aggregation (CA) situation.

The technical problems to be solved by the present disclosure are not limited by the above-mentioned technical problems, and other technical problems which are not mentioned above can be clearly understood from the following description by those skilled in the art to which the present disclosure pertains.

In one aspect, there is provided a method for transmitting, by a user equipment, an uplink signal using a carrier aggregation in a wireless communication system, the method comprising transmitting a first uplink signal to a base station on a first component carrier included in a first timing advance group (TAG); and transmitting a second uplink signal to the base station on a second component carrier included in a second TAG, wherein the first TAG and the second TAG apply different timing advances (TAs), wherein a maximum uplink timing difference between the first uplink signal and the second uplink signal is determined based on a maximum subcarrier spacing.

If the maximum subcarrier spacing increases N times, the maximum uplink timing difference is reduced to 1/N times.

The maximum subcarrier spacing is set to a maximum value among subcarrier spacings supported in a specific frequency band, the wireless communication system or a TAG.

A TA granularity for the first TAG and the second TAG is configured based on the maximum subcarrier spacing.

Each of the first TAG and the second TAG is configured with a single numerology or multiple numerologies.

If each of the first TAG and the second TAG is configured with the single numerology, a maximum TA is configured for each subcarrier spacing.

If each of the first TAG and the second TAG is configured with the multiple numerologies, a maximum TA in each TAG is configured based on a minimum subcarrier spacing.

The first TAG is a primary TAG (pTAG), and the second TAG is a secondary TAG (sTAG).

In another aspect, there is provided a method for receiving, by a user equipment, a downlink signal using a carrier aggregation in a wireless communication system, the method comprising receiving a first downlink signal from a base station on a first component carrier included in a first timing advance group (TAG); and receiving a second downlink signal from the base station on a second component carrier included in a second TAG, wherein a maximum uplink timing difference between the first downlink signal and the second downlink signal is determined based on at least one of a receive buffer size, a latency or a maximum TA.

The first downlink signal is a downlink control signal, and the second downlink signal is downlink data.

In another aspect, there is provided a user equipment for transmitting an uplink signal using a carrier aggregation in a wireless communication system, the user equipment comprising a radio frequency (RF) module configured to transmit and receive a radio signal; and a processor functionally connected to the RF module, wherein the processor is configured to transmit a first uplink signal to a base station on a first component carrier included in a first timing advance group (TAG), and transmit a second uplink signal to the base station on a second component carrier included in a second TAG, wherein the first TAG and the second TAG apply different timing advances (TAs), wherein a maximum uplink timing difference between the first uplink signal and the second uplink signal is determined based on a maximum subcarrier spacing.

The present disclosure has an effect capable of efficiently supporting carrier aggregation (CA) in new radio (NR) by defining a method of determining various requirements, TA granularity, and a TA maximum value for supporting a timing advance (TA) or multiple TAs.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION

Figure 1:
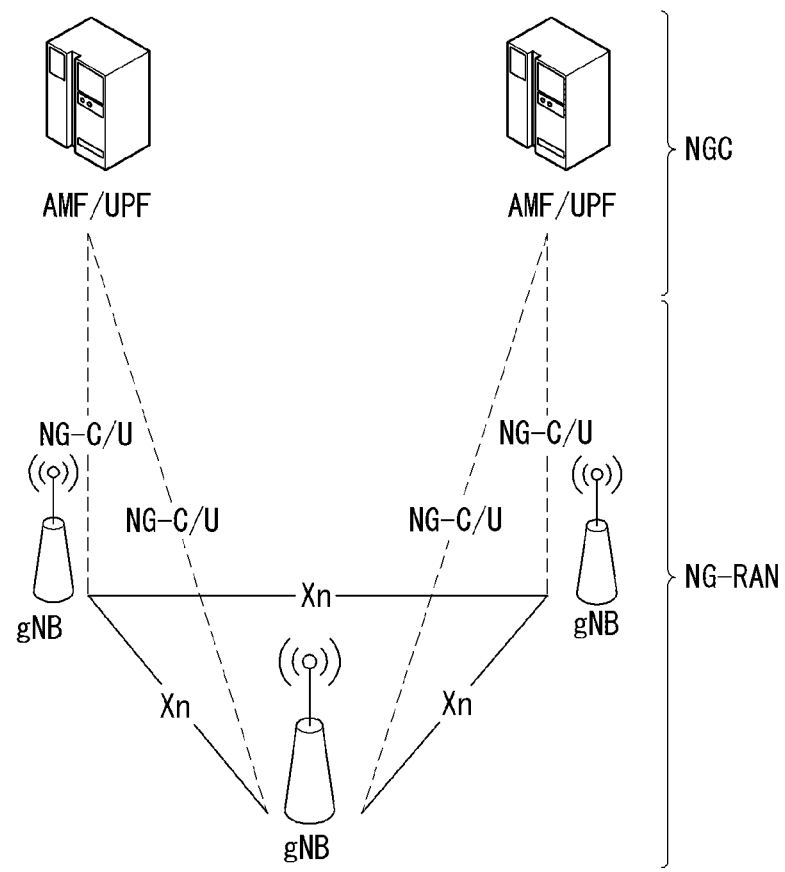
FIG. 1 illustrates an example of an overall structure of a NR system to which a method described in the present disclosure is applicable.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method described in the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
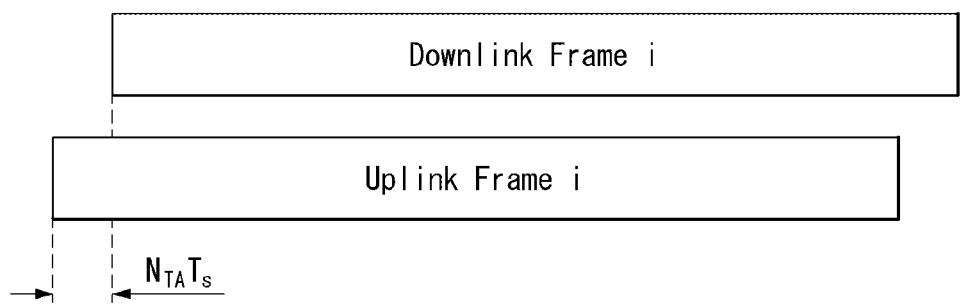
FIG. 2 illustrates a relation between an uplink frame and a downlink frame in a wireless communication system to which a method described in the present disclosure is applicable.

FIG. 2 illustrates a relationship between a UL frame and a DL frame in a wireless communication system to which a method described in the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ frame in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology µ, and Table 3 shows the number of OFDM symbols per slot for an extended CP in the numerology µ.

TABLE 2

| | Slot Configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |

TABLE 2-continued

| | | Slot Configuration | | | | |
|---|---|---|---|---|---|---|
| | | 0 | | | 1 | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 4 | 14 | 160 | 16 | — | — | — |
| 5 | 14 | 320 | 32 | — | — | — |

TABLE 3

| | | Slot Configuration | | | | |
|---|---|---|---|---|---|---|
| | | 0 | | | 1 | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
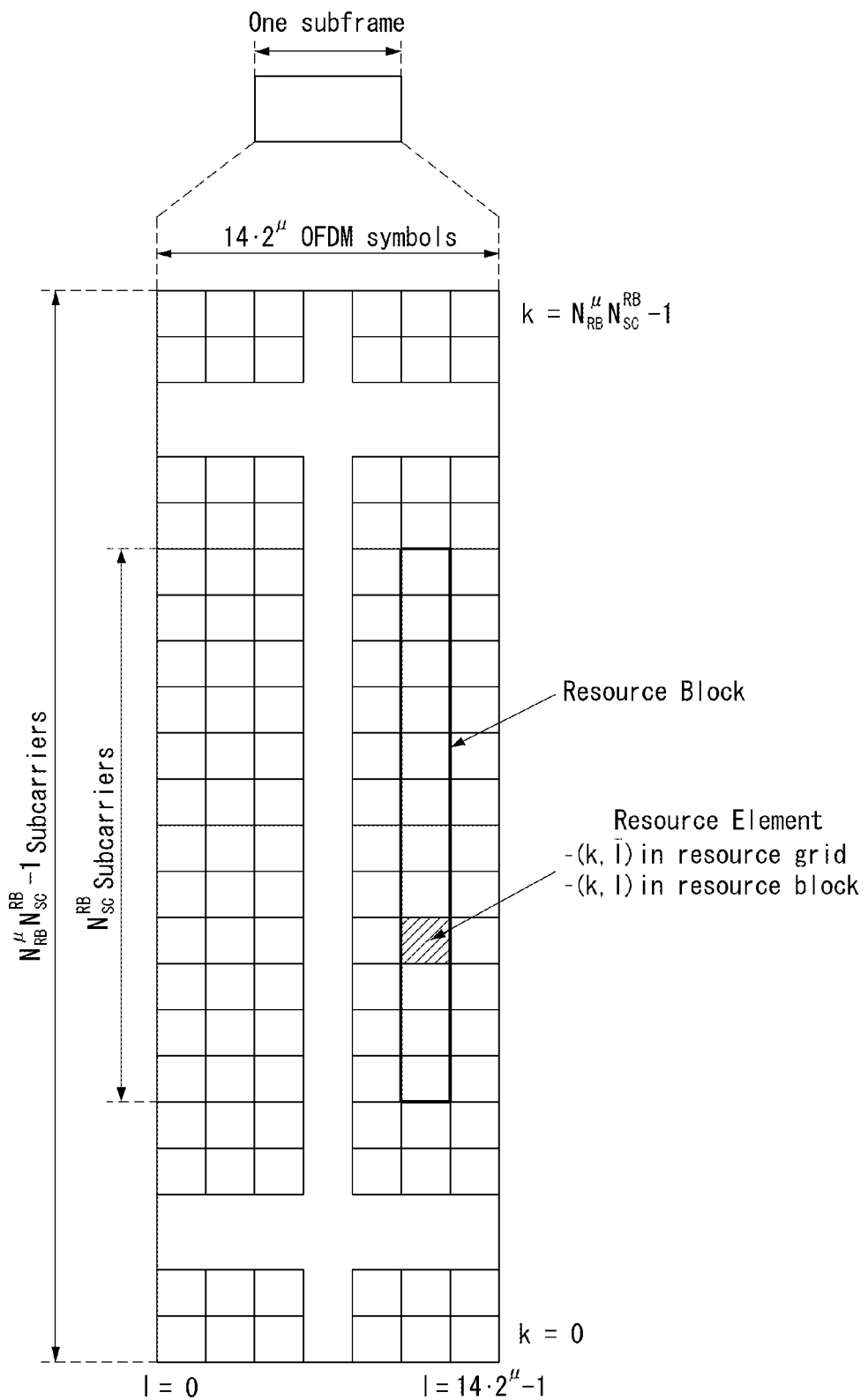
FIG. 3 illustrates an example of a resource grid supported in a wireless communication system to which a method described in the present disclosure is applicable.

FIG. 3 illustrates an example of a resource grid supported in a wireless communication system to which a method described in the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max, \mu}$. The above $N_{RB}^{max, \mu}$ indicates the maximum transmission bandwidth, and it may change not just between numerologies, but between UL and DL.

Figure 4:
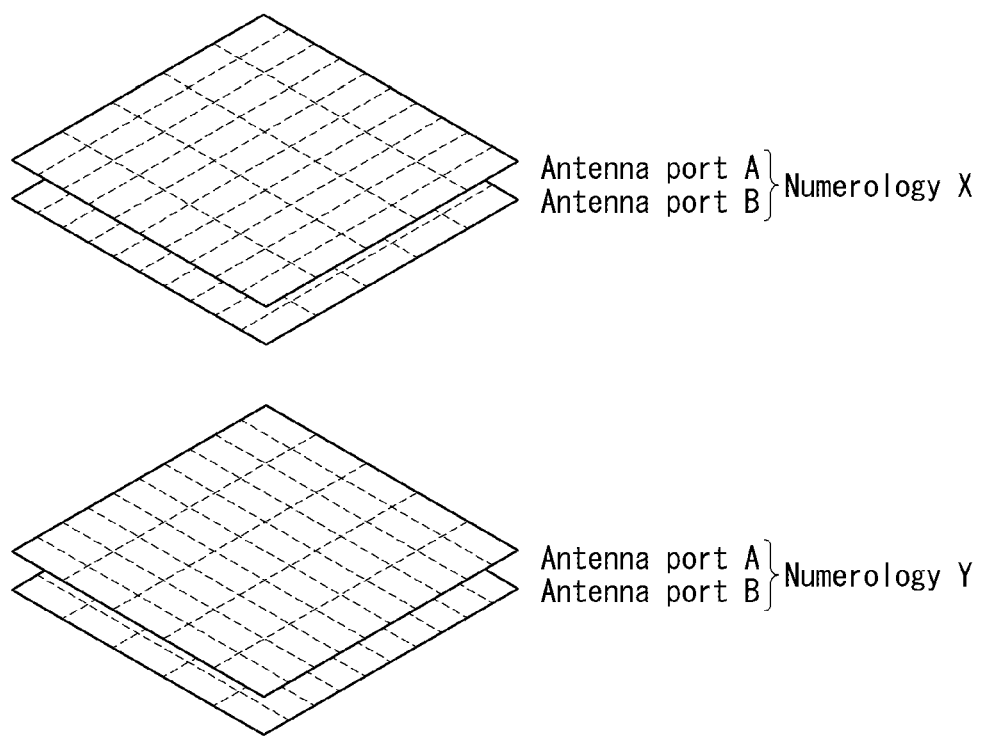
FIG. 4 illustrates examples of a resource grid per antenna port and numerology to which a method described in the present disclosure is applicable.

In this case, as illustrated in FIG. 4, one resource grid may be configured per the numerology μ and an antenna port p.

FIG. 4 illustrates examples of a resource grid per antenna port and numerology to which a method described in the present disclosure is applicable.

Each element of resource grid for the numerology μ and the antenna port p is called a resource element and is uniquely identified by an index pair (k,l̄), where k=0, ..., $N_{RB}^{\mu}N_{sc}^{RB}$=1 is an index in a frequency domain, and l̄=0, ..., $2^{\mu}N_{symb}^{(\mu)}$=1 refers to a location of a symbol on a subframe. The index pair (k, l̄) is used to refer to a resource element in a slot, where l=0, ..., $N_{symb}^{\mu}$−1.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

A physical resource block is defined as $N_{sc}^{RB}$=12 consecutive subcarriers on the frequency domain. On the frequency domain, physical resource blocks are numbered from 0 to $N_{RB}^{\mu}$−1. A relation between a physical resource block number $n_{PRB}$ on the frequency domain and the resource elements (k,l) is given by Equation 1.

$$n_{PRB} = \left\lfloor \frac{k}{N_{sc}^{RB}} \right\rfloor \qquad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}$−1 on the frequency domain.

Self-Contained Slot Structure

Figure 5:
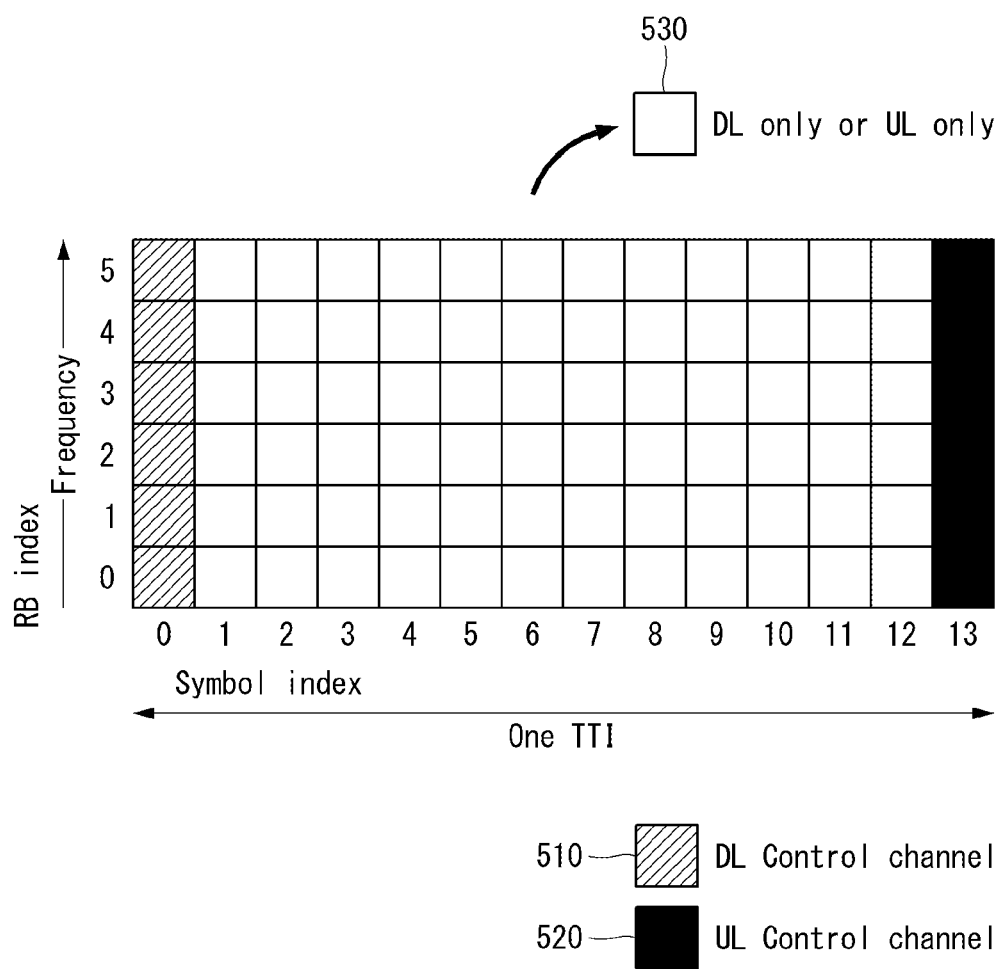
FIG. 5 illustrates an example of a self-contained slot structure to which a method described in the present disclosure is applicable.

To minimize latency of data transmission in a TDD system, 5G new RAT (NR) has considered a self-contained slot structure illustrated in FIG. 5.

That is, FIG. 5 illustrates an example of a self-contained slot structure to which a method described in the present disclosure is applicable.

In FIG. 5, a hatched portion 510 denotes a downlink control region, and a black portion 520 denotes an uplink control region.

A non-marked portion 530 may be used for downlink data transmission or uplink data transmission.

Such a structure may be characterized in that DL transmission and UL transmission are sequentially performed in one slot, DL data is sent in one slot, and UL Ack/Nack is also transmitted and received in one slot.

Such a slot may be defined as a 'self-contained slot'.

That is, through the slot structure, the base station reduces the time it takes to retransmit data to the UE when a data transmission error occurs, and thus can minimize latency of final data transfer.

In the self-contained slot structure, the base station and the UE require a time gap in a process for switching from a transmission mode to a reception mode or a process for switching from the reception mode to the transmission mode.

To this end, in the corresponding slot structure, some OFDM symbols at time of switching from DL to UL are configured as a guard period (GP).

Carrier Aggregation

In embodiments of the present disclosure, a communication environment to be considered includes all multi-carrier supporting environments. That is, a multi-carrier system or a carrier aggregation (CA) system used in the present disclosure refers to a system that aggregates and uses one or more component carriers (CCs) with a bandwidth less than a target band when configuring a target wideband, in order to support a wideband.

In the present disclosure, multi-carrier means aggregation of carriers (or carrier aggregation). In this instance, the aggregation of carriers means both aggregation between continuous carriers and aggregation between non-contiguous carriers. Further, the number of component carriers aggregated between downlink and uplink may be differently set. A case where the number of downlink component carriers (hereinafter referred to as "DL CC") and the number of uplink component carriers (hereinafter, referred to as "UL CC") are the same is referred to as "symmetric aggregation", and a case where the number of downlink component carriers and the number of uplink component carriers are different is referred to as "asymmetric aggregation". The carrier aggregation may be used interchangeably with a term such as bandwidth aggregation or spectrum aggregation.

Carrier aggregation configured by combining two or more component carriers aims at supporting up to a bandwidth of 100 MHz in the LTE-A system. When one or more carriers with a bandwidth less than a target band are combined, a bandwidth of the combined carriers may be limited to a bandwidth used in an existing system in order to maintain backward compatibility with the existing IMT system. For example, the existing 3GPP LTE system supports bandwidths of {1.4, 3, 5, 10, 15, 20} MHz, and a 3GPP LTE-advanced (i.e., LTE-A) system may be configured to support a bandwidth greater than 20 MHz by using only the bandwidths for compatibility with the existing system. Further, the carrier aggregation system used in the preset disclosure may be configured to support the carrier aggregation by defining a new bandwidth regardless of the bandwidth used in the existing system.

The LTE-A system uses a concept of a cell to manage radio resources.

An environment of the carrier aggregation may be called a multi-cell environment. The cell is defined as a combination of a pair of a downlink resource (DL CC) and an uplink resource (UL CC), but the uplink resource is not essential. Therefore, the cell may consist of only the downlink resource or both the downlink resource and the uplink resource. If a specific UE has only one configured serving cell, the cell may have one DL CC and one UL CC. However, if the specific UE has two or more configured serving cells, the cells have DL CCs as many as the cells, and the number of UL CCs may be equal to or less than the number of DL CCs.

Alternatively, on the contrary, the DL CC and the UL CC may be configured. That is, when the specific UE has multiple configured serving cells, a carrier aggregation environment, in which the number of UL CCs is more than the number of DL CCs, may also be supported. That is, the carrier aggregation may be understood as aggregation of two or more cells each having a different carrier frequency (center frequency). The 'cell' described here should be distinguished from a 'cell' as a region which is generally used and is covered by the base station.

The cell used in the LTE-A system includes a primary cell (PCell) and a secondary cell (SCell). The PCell and the SCell may be used as a serving cell. For the UE which is in an RRC CONNECTED state, but does not have the configured carrier aggregation or does not support the carrier aggregation, only one serving cell consisting of only the PCell exists. On the other hand, for the UE which is in the RRC CONNECTED state and has the configured carrier aggregation, one or more serving cells may exist, and the PCell and one or more SCells are included in all serving cells.

The serving cell (PCell and SCell) may be configured through an RRC parameter. PhysCellId as a physical layer identifier of the cell has integer values of 0 to 503. SCellIndex as a short identifier used to identify the SCell has integer values of 1 to 7. ServCellIndex as a short identifier used to identify the serving cell (PCell or SCell) has integer values of 0 to 7. The value of 0 is applied to the PCell, and SCellIndex is previously given for applying to the SCell. That is, a cell having a smallest cell ID (or cell index) in ServCellIndex is the PCell.

The PCell means a cell that operates on a primary frequency (or primary CC). The PCell may be used for the UE to perform an initial connection establishment process or a connection re-establishment process and may be designated as a cell indicated in a handover process. Further, the PCell means a cell which is the center of control-related communication among serving cells configured in the carrier aggregation environment. That is, the UE may be allocated and transmit a PUCCH only in a PCell of the corresponding UE and use only the PCell to acquire system information or change a monitoring procedure. An evolved universal terrestrial radio access (E-UTRAN) may change only the PCell for the handover procedure to the UE supporting the carrier aggregation environment by using an RRC connection reconfiguration message RRCConnectionReconfigutaion of higher layer including mobile control information mobilityControlInfo.

The SCell may mean a cell that operates on a secondary frequency (or secondary CC). Only one PCell may be allocated to a specific UE, and one or more SCells may be allocated to the specific UE. The SCell can be configured after RRC connection establishment is achieved and used to provide an additional radio resource. The PUCCH does not exist in residual cells, i.e., the SCells excluding the PCell from the serving cells configured in the carrier aggregation environment. The E-UTRAN may provide all system information related to an operation of a related cell, which is in an RRC CONNECTED state, through a dedicated signal when adding the SCells to the UE that supports the carrier aggregation environment. A change of the system information may be controlled by releasing and adding the related SCell, and in this case, the RRC connection reconfiguration message RRCConnectionReconfigutaion of higher layer may be used. The E-UTRAN may perform dedicated signaling having a different parameter for each UE rather than broadcasting in the related SCell.

After an initial security activation process starts, the E-UTRAN can add the SCells to the initially configured PCell in the connection establishment process to configure a network including one or more SCells. In the carrier aggregation environment, the PCell and the SCell may operate as the respective component carriers. In embodiments described below, a primary component carrier (PCC) may be used as the same meaning as the PCell, and a secondary component carrier (SCC) may be used as the same meaning as the SCell.

FIG. 6 illustrates an example of component carriers and carrier aggregation in a wireless communication system to which the present disclosure is applicable.

Figure 6A:
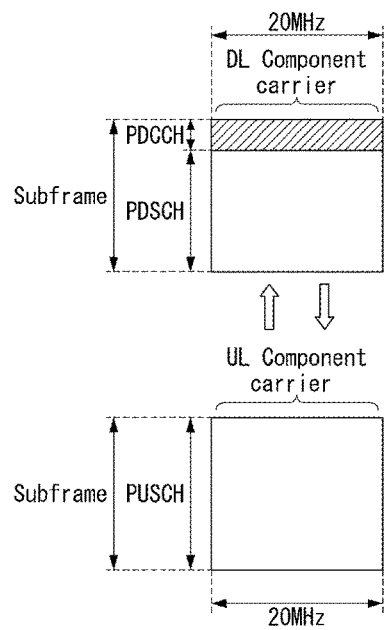
FIG. 6A to B illustrates an example of component carriers and carrier aggregation (CA) in a wireless communication system to which the present disclosure is applicable.

FIG. 6A illustrates a single carrier structure used in the LTE system. A component carrier includes a DL CC and an UL CC. One component carrier may have a frequency range of 20 MHz.

Figure 6B:
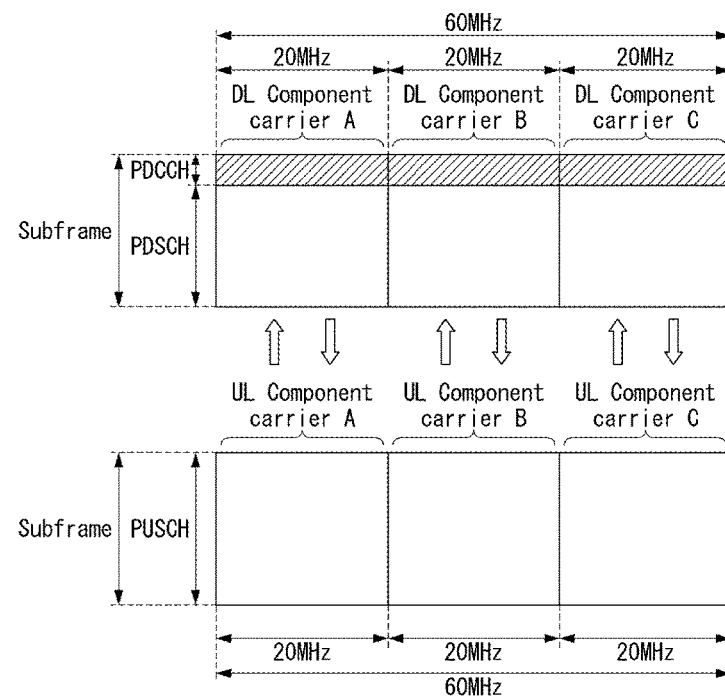

FIG. 6B illustrates a carrier aggregation structure used in the LTE-A system. More specifically, FIG. 6B illustrates that three component carriers having a frequency magnitude of 20 MHz are combined. Three DL CCs and three UL CCs are provided, but the number of DL CCs and the number of UL CCs are not limited. In the case of carrier aggregation, the UE may simultaneously monitor three CCs, receive downlink signal/data, and transmit uplink signal/data.

If N DL CCs are managed in a specific cell, the network may allocate M (M≤N) DL CCs to the UE. In this instance, the UE may monitor only M limited DL CCs and receive the DL signal. Further, the network may prioritize L (L≤M≤N) DL CCs and allocate a primary DL CC to the UE. In this case, the UE has to monitor the L DL CCs. Such a scheme may be equally applied to uplink transmission.

A linkage between a carrier frequency of a downlink resource (or DL CC) and a carrier frequency of an uplink resource (or UL CC) may be indicated by a higher layer message, such as a RRC message, or system information. For example, a combination of the DL resource and the UL resource may be configured by a linkage defined by system information block type 2 (SIB2). More specifically, the linkage may mean a mapping relation between the DL CC, on which a PDCCH carrying a UL grant is transmitted, and the UL CC using the UL grant, and mean a mapping relation between the DL CC (or UL CC) on which data for HARQ is transmitted and the UL CC (or DL CC) on which HARQ ACK/NACK signal is transmitted.

If one or more SCells are configured to the UE, the network may activate or deactivate the configured SCell(s). The PCell is always activated. The network activates or deactivates the SCell(s) by sending an activation/deactivation MAC control element.

The activation/deactivation MAC control element has a fixed size and consists of a single octet including seven C-fields and one R-field. The C-field is configured for each SCell index (SCellIndex), and indicates the activation/deactivation state of the SCell. If a value of the C-field is set to '1', it indicates that a SCell having a corresponding SCell index is activated. If a value of the C-field is set to '0', it indicates that a SCell having a corresponding SCell index is deactivated.

Further, the UE maintains a timer sCellDeactivationTimer per configured SCell and deactivates the associated SCell when the timer expires. The same initial timer value is applied to each instance of the timer sCellDeactivationTimer and is configured by RRC signaling. When the SCell(s) are added or after handover, initial SCell(s) are in a deactivation state.

The UE performs the following operation on each of the configured SCell(s) in each TTI.

If the UE receives an activation/deactivation MAC control element that activates the SCell in a specific TTI (subframe n), the UE activates the SCell in a TTI (subframe n+8 or thereafter) corresponding to predetermined timing and (re)starts a timer related to the corresponding SCell. That fact that the UE activates the SCell means that the UE applies a normal SCell operation, such as sounding reference signal (SRS) transmission on the SCell, channel quality indicator (CQI)/precoding matrix indicator (PMI)/rank indication (RI)/precoding type indicator (PTI) reporting for the SCell, PDCCH monitoring on the SCell, and PDCCH monitoring for the SCell.

If the UE receives an activation/deactivation MAC control element that deactivates the SCell in a specific TTI (subframe n) or if a timer related to a specific TTI (subframe n) activated SCell expires, the UE deactivates the SCell in a TTI (subframe n+8 or thereafter) corresponding to predetermined timing, stops the timer of the corresponding SCell, and flushes all of HARQ buffers related to the corresponding SCell.

If a PDCCH on the activated SCell indicates an uplink grant or a downlink assignment or if a PDCCH on a serving cell scheduling the activated SCell indicates an uplink grant or a downlink assignment for the activated SCell, the UE restarts a timer related to the corresponding SCell.

If the SCell is deactivated, the UE does not transmit the SRS on the SCell, does not report CQI/PMI/RI/PTI for the SCell, does not transmit UL-SCH on the SCell, and does not monitor the PDCCH on the SCell.

The above-described carrier aggregation has been described based on the LTE/LTE-A system, but it is for convenience of description and can be equally or similarly extended and applied to the 5G NR system. In particular, carrier aggregation deployment scenarios that may be considered in the 5G NR system may be the same as FIG. 7.

FIG. 7 illustrates examples of deployment scenarios considering carrier aggregation in a NR system.

Referring to FIGS. 7, F1 and F2 may respectively mean a cell configured to a first frequency (or a first frequency band, a first carrier frequency, a first center frequency) and a cell configured as a second frequency (or a second frequency band, a second carrier frequency or a second center frequency).

Figure 7A:
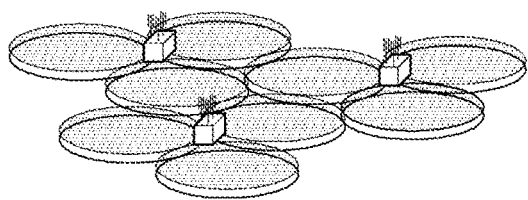
FIG. 7A to 7E illustrates examples of deployment scenarios considering carrier aggregation in a NR system.

FIG. 7A illustrates a first CA deployment scenario. As illustrated in FIG. 7A, the F1 cell and the F2 cell may be co-located and overlaid. In this case, both the two layers can provide sufficient coverage, and mobility can be supported on the two layers. The first CA deployment scenario may include a case where the F1 cell and the F2 cell are present in the same band. In the first CA deployment scenario, it may be expected that aggregation is possible between the overlaid F1 and F2 cells.

Figure 7B:
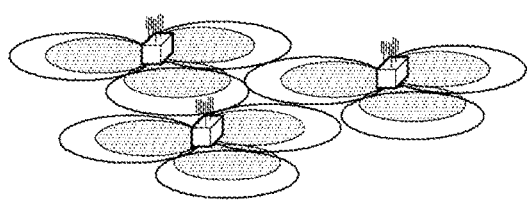

FIG. 7B illustrates a second CA deployment scenario. As illustrated in FIG. 7B, the F1 cell and the F2 cell may be co-located and overlaid, but the F2 cell may support smaller coverage due to a larger path loss. In this case, only the F1 cell provides sufficient coverage, and the F2 cell may be used to improve throughput. In this instance, mobility may be performed based on the coverage of the F1 cell. The second CA deployment scenario may include a case where the F1 cell and the F2 cell are present in different bands (e.g., the F1 cell is present in {800 MHz, 2 GHz} and the F2 cell is present in {3.5 GHz}). In the second CA deployment scenario, it may be expected that aggregation is possible between the overlaid F1 and F2 cells.

Figure 7C:
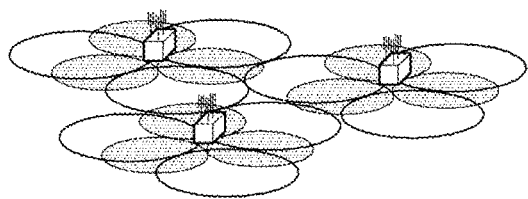

FIG. 7C illustrates a third CA deployment scenario. As illustrated in FIG. 7C, the F1 cell and the F2 cell are co-located and overlaid, but antennas of the F2 cell may be directed to boundaries of the F2 cell so that cell edge throughput is increased. In this case, the F1 cell provides sufficient coverage, but the F2 cell may potentially have holes due to a larger path loss. In this instance, mobility may be performed based on the coverage of the F1 cell. The third CA deployment scenario may include a case where the F1 cell and the F2 cell are present in different bands (e.g., the F1 cell is present in {800 MHz, 2 GHz} and the F2 cell is present in {3.5 GHz}). In the third CA deployment scenario, it may be expected that the F1 and F2 cells of the same base station (e.g., eNB) can be aggregated in a region where coverage overlaps.

Figure 7D:
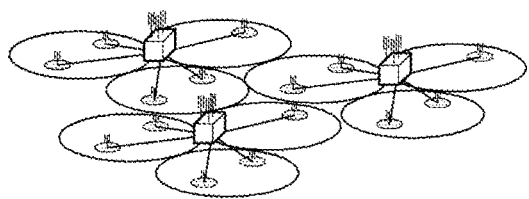

FIG. 7D illustrates a fourth CA deployment scenario. As illustrated in FIG. 7D, the F1 cell provides macro coverage, and F2 remote radio heads (RRHs) may be used to improve throughput at hot spots. In this instance, mobility may be performed based on the coverage of the F1 cell. The fourth CA deployment scenario may include both a case where the F1 cell and the F2 cell correspond to DL non-contiguous carriers on the same band (e.g., 1.7 GHz) and a case where the F1 cell and the F2 cell are present on different bands (e.g., the F1 cell is present in {800 MHz, 2 GHz} and the F2 cell is present in {3.5 GHz}). In the fourth CA deployment scenario, it may be expected that the F2 cells (i.e., RRHs) can be aggregated with the F1 cell(s) (i.e., macro cell(s)) underlying the F2 cells.

Figure 7E:
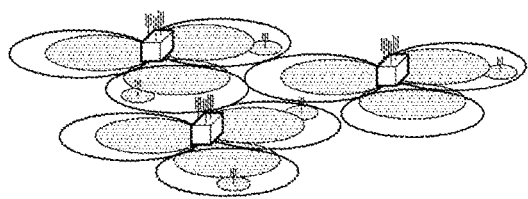

FIG. 7E illustrates a fifth CA deployment scenario. The fifth CA deployment scenario is similar to the second CA deployment scenario, but frequency selective repeaters may be deployed so that coverage can be extended for one of the carrier frequencies. In the fifth CA deployment scenario, it may be expected that the F1 and F2 cells of the same base station can be aggregated in a region where coverage overlaps.

A reception timing difference at the physical layer of UL grants and DL assignments for the same TTI (e.g., depending on the number of control symbols, propagation and deployment scenario) although it is caused by different serving cells may not affect a MAC operation. The UE may need to cope with a relative propagation delay difference of up to 30 us among the CCs to be aggregated in both intra-band non-contiguous CA and inter-band non-contiguous CS. This may mean that the UE needs to cope with a delay spread of up to 30.26 us among the CCs monitored at a receiver because a time alignment of the base station is specified to be up to 0.26 us. This may also mean that the UE have to cope with a maximum uplink transmission timing difference between TAGs of 36.37 us for inter-band CA with multiple TAGs.

When the CA is deployed, a frame timing and a system frame number (SFN) may be aligned across aggregated cells.

LTE Physical Random Access Channel (PRACH)

Table 4 represents an example of a PRACH format supported in current LTE.

As can be seen from Table 4, a maximum cell radius supported in the current LTE is 100.2 km.

A cell radius support of at least the same level is necessary for an in-band operation using a LTE network.

TABLE 4

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 515.6 | 16.7 | 77.3 |
| 2 | 203.1 | 196.9 | 6.3 | 29.5 |
| 3 | 684.4 | 715.6 | 16.7 | 100.2 |

The LTE supports a 4-step contention-based RACH procedure as follows.

(1-step) Msg1: RA preamble transmission (2-step) Msg2: RAR (random access response) (TA command, msg3 scheduling)

(3-step) Msg3: RA messages (RRC connection request, UE ID)

(4-step) Msg4: contention resolution messages (RRC connection setup, UE ID)

An operation after the Msg4 proceeds with transmission of a RRC connection setup complete message including HARQ-ACK and UE ID for the Msg4.

A new radio (NR) supports various numerologies for each component carrier (CC) considering use case scenarios (eMBB, mMTC, URLLC, V2X) considered in a NR system and deployments in various frequency bands.

Here, the numerology refers to a subcarrier spacing (SCS) and a cyclic prefix CP).

The present disclosure provides a method for supporting a timing adjustment (TA) in a NR carrier aggregation (CA) situation where the numerology may be different for each CC and/or between CCs.

'A and/or B' used in the present disclosure may be interpreted as the same meaning as 'including at least one of A or B'.

The TA may be expressed as a time adjustment or a timing advance.

The timing advance (TA) refers to a timing offset that the UE applies upon the uplink transmission, for the purpose of orthogonal uplink/downlink transmission/reception at a base station (e.g., eNB), i.e., in order to adjust synchronization of an uplink slot (or subframe) and a downlink slot (or subframe).

The NR can configure multiple timing advance groups (TAGs), i.e., multiple TAGS to support CA deployment scenario 4 (HetNet), etc. of FIG. 7, apply a different TA for each TAG, and perform the uplink transmission.

The TAG may include at least one cell (or CC).

A TAG including the PCell among the TAGS is expressed as a pTAG, and a TAG consisting of only SCell is expressed as a sTAG.

Initial timing information about an initial pTAG is acquired through a random access (RA) procedure.

Hereafter, timing information about the sTAG may be acquired through a contention-free RA procedure in a narrowband PDCCH (NPDCCH) order in a RRC-CONNECTED state.

That is, the present disclosure provides a method of determining various requirements, TA granularity, and a TA maximum value for supporting a TA or multiple TAs in the NR CA.

Methods described in various embodiments of the present disclosure are described below.

First Embodiment

A first embodiment relates to a method of determining a max DL receive timing difference requirement.

A receive timing difference between downlink CCs in NR CA affects a receive buffer, latency, a max TA of a UE, and the like. Here, the max TA means a maximum value of the TA.

That is, the first embodiment describes a method of determining the max DL receive timing difference requirement for the purpose of a reduction in a receiver buffer size burden and latency, or considering the max TA.

The max DL receive timing difference requirement may be determined based on the following various methods (Methods 1 to 3).

(Method 1)

Method 1 is a method of determining the max DL receive timing difference requirement considering receive buffer requirements.

For example, if a downlink control signal received from CC1 is excessively delayed compared to downlink data received from CC2, the UE may have a burden of buffering data before processing control data.

In this case, the max DL receive timing difference requirement can be determined based on a DL receive buffer size.

In this instance, if CP overhead is the same and receive bandwidth of the UE is the same, data received from CC2 has the same transfer data rate regardless of a subcarrier spacing (SCS).

Therefore, the DL receive buffer requirement is the same regardless of the SCS.

If the CP overheads are different, DL receive buffer requirements of the receiver may be differently configured because an effective data rate except the CP is different.

For example, in case of an extended CP, an actual DL receive buffer requirement of the UE is reduced because a CP overload of the extended CP is greater than that of a normal CP.

If the DL receive buffer size is stipulated as UE capability, the method may determine each max DL receive timing difference requirement that can be supported within a limit of each DL receive buffer size, and use a max DL receive timing difference requirement corresponding to the max DL receive timing difference requirement determined depending on the UE capability.

Alternatively, the method may stipulate a minimum requirement of the DL receive buffer size, determine a max DL receive timing difference requirement as a maximum DL receive timing difference value that can be supported by a DL receive buffer corresponding to the minimum requirement, and commonly use it for the UE.

Alternatively, the max DL receive timing difference requirement may be determined based on a minimum value of the DL receive buffer requirement supporting within one or multiple TAG(s), and the corresponding value may be commonly used for the UE.

If a DL receive bandwidth increases, a data rate increases. Therefore, the DL receive buffer requirement for supporting the same DL receive timing difference is increased.

Thus, the DL receive bandwidth should be considered when determining the max DL receive timing difference requirement.

For example, under the same max DL receive timing difference requirement, if the DL receive bandwidth increases N times, the DL receive buffer requirement is also increased N times.

Accordingly, the max DL receive timing difference requirement can be determined as follows, considering the DL receive buffer size, and/or DL receive bandwidth X and/or CP overhead.

"For the UE supporting DL receive bandwidth X and DL receive buffer size Y, if the CP overhead is C, the max DL receive timing difference is Z."

Here, the DL receive bandwidth may mean a maximum DL receive bandwidth supported in the UE or a maximum receive bandwidth supported in a corresponding CC or the like for convenience of operation.

The DL receive buffer size may mean a minimum DL receive buffer size or a minimum DL receive buffer requirement or the like that can be configured in a corresponding CC.

The CP overhead may mean a normal CP corresponding to the CP overhead that is representatively used, or an extended CP in which the CP overhead is the largest.

For example, the normal CP can support the smaller max DL receive timing difference than the extended CP under the same DL receive buffer size.

Thus, in order to support the normal CP and the extended CP at the same time, the max DL receive timing difference can be determined based on the normal CP.

(Method 2)

Method 2 is a method of determining the max DL receive timing difference requirement considering latency requirements.

Due to a DL timing difference between downlink control and downlink data, a time from a downlink control reception time to a data decoding complete time may be delayed.

Accordingly, the max DL receive timing difference requirement may be limited for services, in which latency is important, due to the latency requirements.

(Method 3)

Method 3 is a method of determining the max DL receive timing difference requirement considering max TA requirement.

After the reception of downlink control, the UE performs the operation such as uplink transmission after downlink control decoding, uplink data preparation, or downlink data decoding (HARQ-ACK preparation if necessary).

Upon the uplink transmission, the UE applies the TA.

In this instance, because the UE has to finish the uplink transmission preparation considering the TA, a UE processing time that is substantially available for the uplink transmission is reduced as much as the TA.

In order to secure the available UE processing time even in a max TA situation, the max DL receive timing difference may be limited.

Second Embodiment

Next, a second embodiment relates to a method of determining a max UL transmit timing difference requirement.

The NR may configure multiple TAGs to support CA deployment scenario 4 (HetNet), etc., apply a different TA for each TAG, and perform the uplink transmission.

In this instance, if there is a difference in a transmit timing between uplink transmissions transmitted to different TAGs (e.g., transmitted to a pTAG and a sTAG), a problem may occur in terms of power allocation because start points and/or end points of two slots are not aligned.

An effect of the power allocation problem due to the UL transmit timing difference is more serious when a slot length is short under a given UL transmit timing difference (e.g., when SCS is large).

For example, if the slot length is 1/N as the SCS increases N times, a ratio affected by the power allocation problem within the slot is increased N times.

Various methods of determining the max UL transmit timing difference requirement are described below.

(Method 1)

Method 1 is to configure a max UL transmit timing difference requirement based on max SCS.

As described above, if the slot length decreases, the effect of the power allocation problem becomes serious.

Accordingly, in order to prevent the above problem, that is, if the method wants to maintain the effect of the power allocation problem within the slot at a certain ratio regardless of numerology, the method can allow the max UL transmit timing difference requirement to be configured based on the max SCS.

A value of the max UL transmit timing difference requirement configured for each max SCS may be a value that has an inverse proportional relationship with a magnitude of the max SCS.

For example, if the max SCS is 15*N kHz, a value of the max UL transmit timing difference requirement may be 1/N times of a value of the max UL transmit timing difference requirement when the max SCS is 15 kHz.

Here, the max SCS may be a maximum value among all of SCS values supported in a corresponding system or a frequency band or a center frequency or a TAG or a CC.

For reference, a relation between the value of the max UL transmit timing difference requirement and the (max) SCS may be described in the form of a table in the standard document, and in this case, the above descriptions may be applied.

The max SCS supported in the TAG or the CC may be a configured TAG or CC or an activated TAG or CC that actually performs UL transmission.

(Method 2)

Method 2 is to determine a max UL transmit timing difference requirement by means of a fixed specific value.

That is, the Method 2 uses a fixed value as the max UL transmit timing difference requirement regardless of SCS.

In other words, the max UL transmit timing difference requirement is determined based on a specific SCS (e.g., based on 15 kHz SCS), and is applied regardless of numerology actually using it.

The Method 2 may be applied when the effect of the power allocation problem within the slot does not need to be maintained at a certain ratio.

For example, even if the slot length is 1/N as the SCS increases N times, one TB can be transmitted uniformly across N slots, and the UE can again gather and decode one TB transmitted across multiple slots.

In this case, because the ratio affected by the power allocation problem for one TB is constant, the Method 2 does not need to maintain the effect of the power allocation problem within the slot at a certain ratio, as in the Method 1 described above.

Examples of the case in which one TB is transmitted uniformly across N slots may include a slot aggregation or a multi-slot scheduling.

(Method 3)

Method 3 is to select one of the Method 1 or the Method 2 according to a scheduling method.

That is, the Method 3 may determine the Method 1 or the Method 2 depending on whether there is the slot aggregation or the multi-slot scheduling.

For example, if the slot aggregation or the multi-slot scheduling is configured, the Method 1 may be determined. Otherwise, the Method 2 may be determined.

Alternatively, on the contrary, the slot aggregation or the multi-slot scheduling may be configured in line with the Method 1 or the Method 2.

For example, if the Method 1 is configured, all of a single-slot scheduling and the slot aggregation or the multi-slot scheduling can be selected.

Alternatively, if the Method 2 is configured, it may be limited to select only the slot aggregation or the multi-slot scheduling because a specific slot may be greatly affected by the power allocation problem.

Here, the single-slot scheduling refers to a general case in which one TB is transmitted in one slot.

The slot aggregation or the multi-slot scheduling refers to another method in which one TB is transmitted uniformly across N slots.

In the method of determining the max UL transmit timing difference requirement, if a fixed value of the max UL transmit timing difference requirement is applied, the corresponding fixed value may be a fixed value that is predefined in the standard document, or a value that is RRC-configured in advance.

Third Embodiment

Next, a third embodiment relates to a method of determining TA granularity.

In the existing LTE, TA granularity is fixed to 16 Ts.

Here, 1 Ts≈1/(30.72 MHz) 0.0325 μs.

Because a length of LTE normal CP is 144 Ts (or 160 Ts), a ratio of the TA granularity to the CP is 16/144=1/9.

In other words, about nine TA adjustment units exist in the normal CP.

If it is assumed that LTE TA granularity is used as it is, and a subcarrier spacing of 120 kHz is used in NR, a ratio of the TA granularity to the CP may be 16/144*4=4/9.

That is, in the NR, about two TA adjustment units may exist in the CP.

Considering the TA fine adjustment and a TA estimation error, etc., the adjustment for the TA granularity is necessary in the NR.

The TA granularity may be determined based on the following methods depending on a single TAG and multiple TAGs.

For Single TAG (Method 1) It is a case where a TAG consists of a single numerology.

(Method 1-1) The TA granularity may be configured for each SCS.

In the NR, if the TAG consists of a single numerology, the TA granularity may be configured for each SCS.

A value of the TA granularity configured for each SCS may be inversely proportional to the SCS.

For example, if the SCS constituting the TAG is N times 15 kHz, the TA granularity may be configured to scale down to 1/N times compared to the TA granularity of 15 kHz.

(Method 2) It is a case where the TAG consists of a mixed numerology.

In this case, the TA granularity may be configured based on a max SCS in the TAG.

In the NR, if the TAG consists of a mixed numerology, i.e., if CCs having various SCSs exist in the TAG, the TA granularity may be configured based on a max SCS among them.

For example, if the max SCS in the TAG is N times 15 kHz, the TA granularity may be configured to scale down to 1/N times compared to the TA granularity of 15 kHz.

For Multiple TAGS (Method 1) It is a case where each TAG consists of a single numerology.

(Method 1-1) The TA granularity may be configured for each SCS of each TAG.

In the NR, if each TAG constituting multiple TAGs consists of a single numerology, TA granularity corresponding to the corresponding SCS may be configured for each TAG.

In this instance, the above (Method 1) may be used as a method of configuring the TA granularity for each TAG.

(Method 1-2) The TA granularity may be configured based on a max SCS in multiple TAGs.

In the NR, if each TAG constituting multiple TAGs consists of a single numerology, the TA granularity may be configured based on a maximum value (i.e., max SCS) among SCSs constituting each TAG for the purpose of common TA granularity application.

For example, if the max SCS in the TAG is N times 15 kHz, the TA granularity may be configured to scale down to 1/N times compared to the TA granularity of 15 kHz.

(Method 2) It is a case where each TAG consists of a mixed numerology.

(Method 2-1) The TA granularity may be configured based on a max SCS of each TAG.

In the NR, if each TAG constituting multiple TAGs consists of a mixed numerology, i.e., if CCs having various SCSs exist in the TAG, the TA granularity may be configured based on a max SCS of each TAG. A method of configuring the TA granularity based on a max SCS of each TAG may use the (Method 2) for the single TAG.

(Method 2-2) The TA granularity may be configured based on a max SCS in multiple TAGs.

In the NR, if each TAG constituting multiple TAGs consists of a mixed numerology, i.e., if CCs having various SCSs exist in the TAG, the TA granularity may be configured based on a maximum value (i.e., max SCS) among SCSs constituting each TAG for the purpose of common application of the TA granularity.

If a fixed max TA value or a fixed TA granularity value is applied in the TA granularity configuration method, the corresponding fixed max TA value or TA granularity value may be a fixed value that is pre-defined in the standard document, or a value that is RRC-configured in advance.

Fourth Embodiment

Next, a fourth embodiment relates to a method of determining a max TA.

In NR, a method of configuring a max TA may be divided into a case where a TAG consists of a single numerology and a case where a TAG consists of a mixed numerology.

First, the case where the TAG consists of the single numerology is described.

If the TAG consists of the single numerology, the following three methods are described as the max TA determination method.

(Method 1) It is a method of configuring the max TA for each SCS.

The max TA configured for each SCS may be a value that is configured to have an inverse proportional relationship with the SCS.

For example, if the SCS is N times 15 kHz, the max TA may be configured to be 1/N times compared to the max TA of 15 kHz.

When this method is used, the max TA increases or decreases depending on value of the SCS constituting the TAG if a fixed value is used as the TA granularity regardless of the SCS.

As the max TA increases or decreases, MAC RAR and MAC CE TA command bit size may increase or decrease.

In this instance, in order to fix the TA command bit size regardless of the SCS, the TA granularity may be a value configured to have an inverse proportional relationship with the SCS in the same method as the max TA.

(Method 2) It is a method in which the max TA is fixed.

This method configures the max TA value as a fixed value regardless of the SCS constituting the TAG.

The fixed value may be a value fixed to the same max TA as LTE in order to support the same max TA as the existing LTE.

The TA granularity may be used as a fixed value together with the max TA.

In this instance, the fixed value may be a value set based on the configurable max SCS.

Alternatively, the max TA is fixed, and the TA granularity may apply the method of determining the TA granularity for each SCS described above and may use a different configuration value depending on the SCS.

In this instance, the MAC RAR TA command bit size may increase or decrease depending on the SCS.

For example, if the SCS increases N times, the max TA is fixed, and the TA granularity is reduced to 1/N times. Hence, the MAC RAR TA command bit size can be extended to log 2(N) bit.

(Method 3) It is a method in which a hybrid max TA is configured.

If the same network deployment as the existing LTE is used, it may be necessary to support the LTE level max TA even if a SCS of a CC is increased.

This method configures a max TA required for an initial TA to a fixed value in this case and allows the max TA to have the LTE level max TA.

In addition, this method can differently configure the max TA in a TA tracking situation for each max SCS, and thus efficiently manage MAC CE.

The max TA in the TA tracking situation may be a value considering the SCS and/or the CP.

For example, the max TA may be a value configured to have an inverse proportional relationship with the SCS.

Next, the case where the TAG consists of the mixed numerology is described.

If the TAG consists of the mixed numerology, the following three methods are described as the max TA determination method.

(Method 1) It is a method in which the max TA is configured based on a min SCS in the TAG.

This method configures the max TA based on a min SCS among multiple SCSs constituting the TAG.

For example, if 15 kHz SCS, that is LTE SCS, and one or more SCSs corresponding to an integer multiple of 15 kHz exist in the TAG, this method supports at least LTE level max TA.

If the min SCS exceeds 15 kHz, a configured max TA value is applied for the min SCS.

The max TA values applied for each min SCS may be values configured to have an inverse proportional relationship with the SCS. For example, if the SCS is N times 15 kHz, the max TA may be configured to be 1/N times compared to the max TA of 15 kHz.

(Method 2) It is a method in which the max TA is fixed.

This method is a method of configuring a fixed max TA value regardless of SCSs constituting the TAG. The fixed max TA value may be the same max TA value as the existing LTE, or a max TA value that is newly defined in NR.

(Method 3) It is a method in which the max TA is configured based on a max SCS in the TAG.

This method is a method of configuring the max TA based on a max SCS among multiple SCSs constituting the TAG. If the TAG consists of a mixed numerology in NR, a method of configuring TA granularity based on a max SCS among them is described.

With regard to this, it was described that if the max SCS in the TAG is N times 15 kHz, the TA granularity is configured to scale down to 1/N times compared to the TA granularity of 15 kHz.

If a cell deployment scenario that has been already more appropriately reduced than the LTE is assumed for a TAG including a SCS (e.g., 30, 60, 120 kHz) greater than 15 kHz, the max TA may be configured based on the max SCS.

If both the TA granularity and the max TA are reduced based on the max SCS, the MAC CE TA command bit size is equally maintained regardless of the max SCS value, and an integer value of a TA command expressed by the same bit size becomes the form of being scaled and interpreted depending on the max SCS value.

For example, if the max SCS is N times, the integer value of the TA command may be multiplied by 1/N and may be the form of applying as an actual TA value.

If the fixed max TA value or the fixed TA granularity value is applied in the max TA configuration method described above, the corresponding fixed max TA value or TA granularity value may be a fixed value that is pre-defined in the standard document, or a value that is RRC-configured in advance.

Fifth Embodiment

Next, a fifth embodiment is to configure a restriction on DL buffering and UL power control mentioned above.

A max DL receive timing difference may be restricted by a UE DL receive buffer size.

For a UE with a large DL receive buffer size, a supportable max DL receive timing difference is extended, and thus there may be many combinations of CCs capable of DL CA.

In regard to this, in NR CA, the following restrictions may be considered.

For a UE in which the DL receive buffer size is X or less or less than X, there is a restriction on DL CA between CCs in which a DL receive timing difference is Y us or more or exceeds Y us. Alternatively, only one of the corresponding DL CCs is scheduled.

Here, the DL receive buffer size may be reported to the eNB in the form of UE capability, or may be a minimum DL receive buffer size that all the UEs should mandatorily have in order to meet a max DL receiver timing difference requirement.

The max DL receive timing difference may be restricted by a UE DL receive bandwidth.

If the DL receive bandwidth is large, a supportable max DL receive timing difference is reduced, and thus combinations of CCs capable of DL CA may be restricted. In regard to this, in NR CA, the following restriction may be considered.

For a UE in which the DL receive bandwidth is X MHz or more or exceeds X MHz, there is a restriction on DL CA between CCs in which the DL receive timing difference is Y us or more or exceeds Y us. Alternatively, only one of the corresponding DL CCs is scheduled.

Here, the UE DL receive bandwidth may be a configured DL bandwidth, or an activated DL bandwidth receiving actual DA data, or a maximum DL bandwidth provided by a corresponding frequency band, or a maximum DL bandwidth that the UE is able to receive.

Next, a max UL transmit timing difference may be restricted because of the power allocation problem mentioned above, and a supportable max UL transmit timing difference decreases as the max SCS increases.

Thus, combinations of CCs capable of UL CA may be restricted. In regard to this, in NR CA, the following restriction may be considered.

The max UL transmit timing difference or a TA difference between two TAGs restricts the UL CA between CCs that are X us or more or exceed X us. Alternatively, one of the corresponding UL transmissions drops.

When one of the UL transmissions has to drop, the sTAG first drops if it is UL CA for a pTAG and a sTAG.

If all the TAGs consist of sTAGs, a drop order may be determined according to order of TAG ID.

For example, a TAG having a large TAG ID value may first drop.

The supportable max UL transmit timing difference may be a value configured for each max SCS or a fixed value regardless of the max SCS.

If the supportable max UL transmit timing difference is a value configured for each max SCS, the X value of the above restriction may be a value changed for each max SCS. For example, the X value may be a value that has an inverse proportional relationship with the max SCS.

Figure 8:
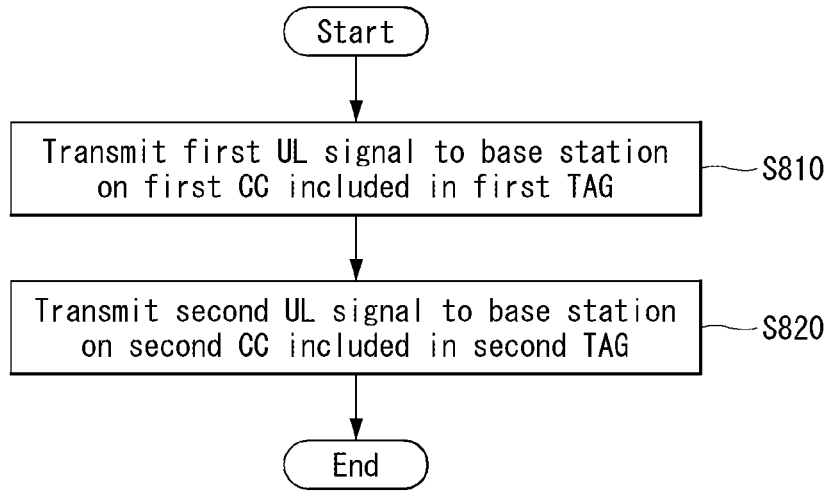
FIG. 8 illustrates an example of an operation of a user equipment (UE) transmitting an uplink signal in a CA situation described in the present disclosure.

FIG. 8 illustrates an example of an operation of a user equipment (UE) transmitting an uplink signal in a CA situation described in the present disclosure.

First, a UE transmits a first uplink signal to a base station on a first component carrier included in a first timing advance group (TAG) in S810.

The UE transmits a second uplink signal to the base station on a second component carrier included in a second TAG in S820.

Here, the first TAG and the second TAG may apply different timing advances (TAs).

A maximum uplink timing difference between the first uplink signal and the second uplink signal may be determined based on a maximum subcarrier spacing.

If the maximum subcarrier spacing increases N times, the maximum uplink timing difference may be reduced to 1/N times.

The maximum subcarrier spacing may be set to a maximum value among subcarrier spacings supported in a specific frequency band, a wireless communication system or a TAG.

A TA granularity for the first TAG and the second TAG may be configured based on the maximum subcarrier spacing.

Each of the first TAG and the second TAG may be configured with a single numerology or multiple numerologies.

If each of the first TAG and the second TAG is configured with the single numerology, a maximum TA may be configured for each subcarrier spacing.

If each of the first TAG and the second TAG is configured with the multiple numerologies, a maximum TA in each TAG may be configured based on a minimum subcarrier spacing.

Here, the first TAG may be a primary TAG (pTAG), and the second TAG may be a secondary TAG (sTAG).

Figure 9:
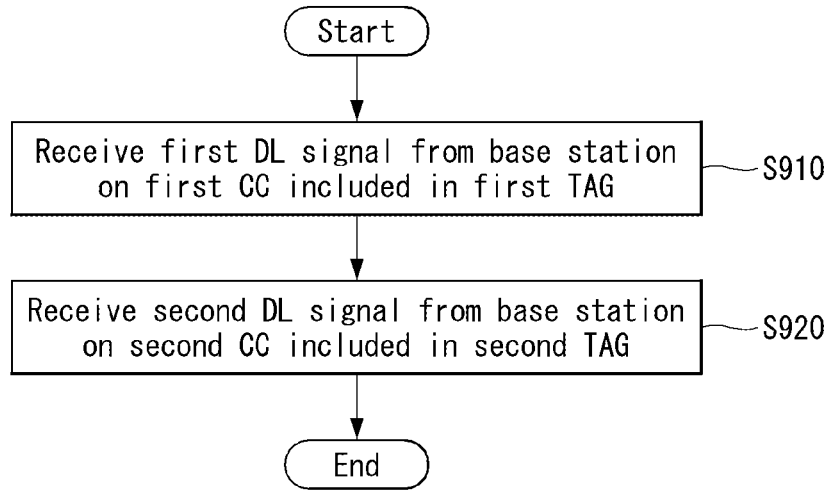
FIG. 9 illustrates an example of an operation of a UE receiving a downlink signal in a CA situation described in the present disclosure.

FIG. 9 illustrates an example of an operation of a UE receiving a downlink signal in a CA situation described in the present disclosure.

First, a UE receives a first downlink signal from a base station on a first component carrier included in a first timing advance group (TAG) in S910.

The UE receives a second downlink signal from the base station on a second component carrier included in a second TAG in S920.

A maximum uplink timing difference between the first downlink signal and the second downlink signal may be determined based on at least one of a receive buffer size, a latency or a maximum TA.

The first downlink signal may be a downlink control signal, and the second downlink signal may be downlink data.

Each embodiment described above can be separately implemented, and one or more embodiments can be combined and implemented.

Overview of Device to which the Present Disclosure is Applicable

Figure 10:
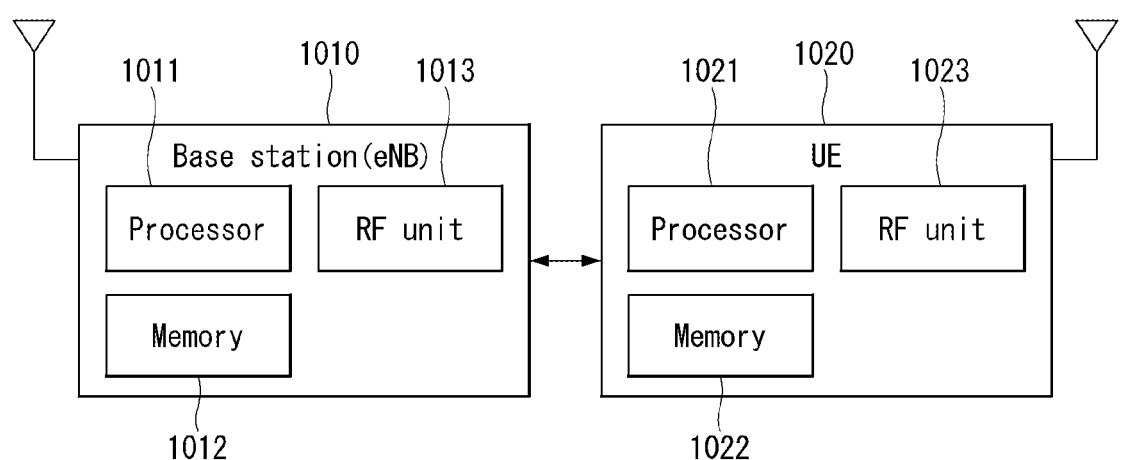
FIG. 10 illustrates a block configuration diagram of a wireless communication device to which methods described in the present disclosure are applicable.

FIG. 10 illustrates a block configuration diagram of a wireless communication device to which methods described in the present disclosure are applicable.

Referring to FIG. 10, a wireless communication system includes a base station 1010 and multiple UEs 1020 located in a region of the base station.

Each of the base station 1010 and the UE 1020 may be represented as a radio device.

The base station 1010 includes a processor 1011, a memory 1012, and a radio frequency (RF) module 1013. The processor 1011 implements functions, processes, and/or methods described in FIGS. 1 to 9. Layers of radio interface protocol may be implemented by the processor 1011. The memory 1012 is connected to the processor 1011 and stores various types of information for driving the processor 1011. The RF module 1013 is connected to the processor 1011 and transmits and/or receives radio signals.

The UE 1020 includes a processor 1021, a memory 1022, and a RF module 1023.

The processor 1021 implements functions, processes, and/or methods described in FIGS. 1 to 9. Layers of radio interface protocol may be implemented by the processor 1021. The memory 1022 is connected to the processor 1021 and stores various types of information for driving the processor 1021. The RF module 1023 is connected to the processor 1021 and transmits and/or receives radio signals.

The memories 1012 and 1022 may be inside or outside the processors 1011 and 1021 and may be connected to the processors 1011 and 1021 through various well-known means.

Further, the base station 1010 and/or the UE 1020 may have a single antenna or multiple antennas.

Figure 11:
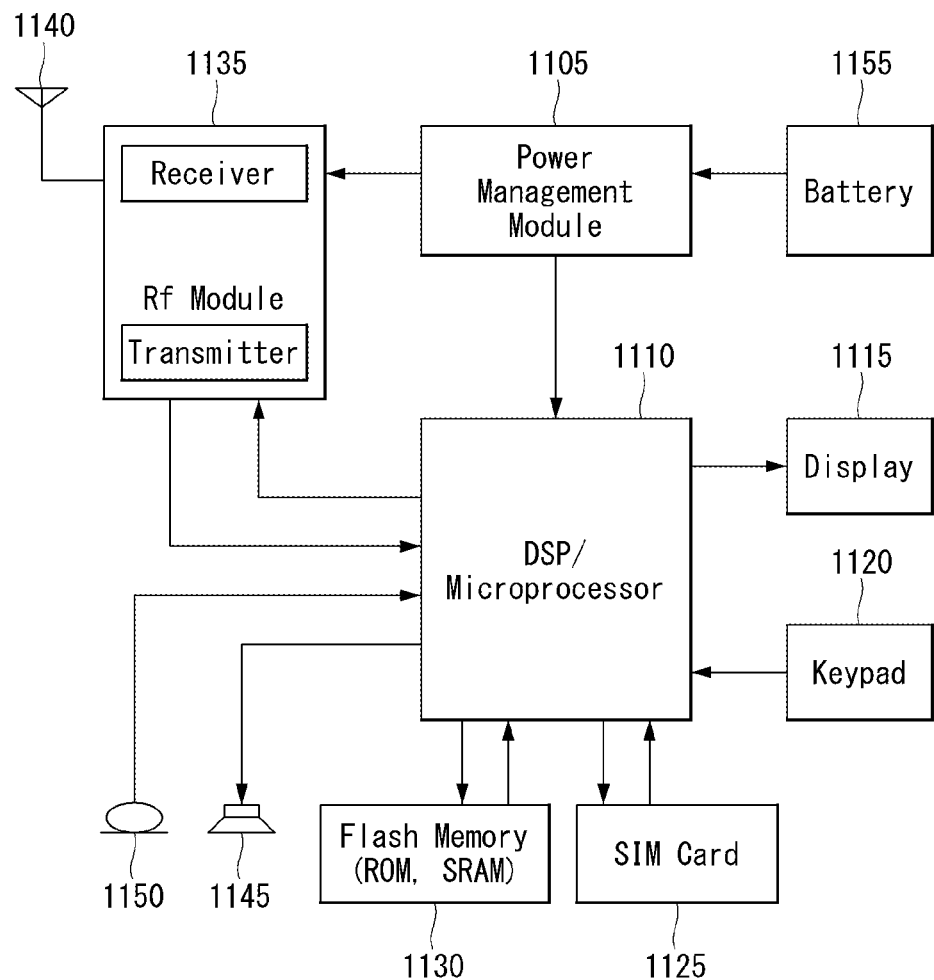
FIG. 11 illustrates a block configuration diagram of a communication device according to an embodiment of the present disclosure.

FIG. 11 illustrates a block configuration diagram of a communication device according to an embodiment of the present disclosure.

In particular, FIG. 11 illustrates in more detail the UE illustrated in FIG. 10.

Referring to FIG. 11, the UE may include a processor (or digital signal processor (DSP)) 1110, an RF module (or RF unit) 1135, a power management module 1105, an antenna 1140, a battery 1155, a display 1115, a keypad 1120, a memory 1130, a subscriber identification module (SIM) card 1125 (which is optional), a speaker 1145, and a microphone 1150. The UE may also include a single antenna or multiple antennas.

The processor 1110 implements functions, processes, and/or methods described in FIGS. 1 to 9. Layers of a radio interface protocol may be implemented by the processor 1110.

The memory 1130 is connected to the processor 1110 and stores information related to operations of the processor 1110. The memory 1130 may be inside or outside the processor 1110 and may be connected to the processors 1110 through various well-known means.

A user inputs instructional information, such as a telephone number, for example, by pushing (or touching) buttons of the keypad 1120 or by voice activation using the microphone 1150. The processor 1110 receives and processes the instructional information to perform an appropriate function, such as to dial the telephone number. Operational data may be extracted from the SIM card 1125 or the memory 1130. Further, the processor 1110 may display instructional information or operational information on the display 1115 for the user's reference and convenience.

The RF module 1135 is connected to the processor 1110 and transmits and/or receives a RF signal. The processor 1110 forwards instructional information to the RF module 1135 in order to initiate communication, for example, transmit a radio signal configuring voice communication data. The RF module 1135 consists of a receiver and a transmitter to receive and transmit the radio signal. The antenna 1140 functions to transmit and receive the radio signal. Upon reception of the radio signal, the RF module 1135 may forward a signal to be processed by the processor 1110 and convert the signal into a baseband. The processed signal may be converted into audible or readable information output via the speaker 1145.

Figure 12:
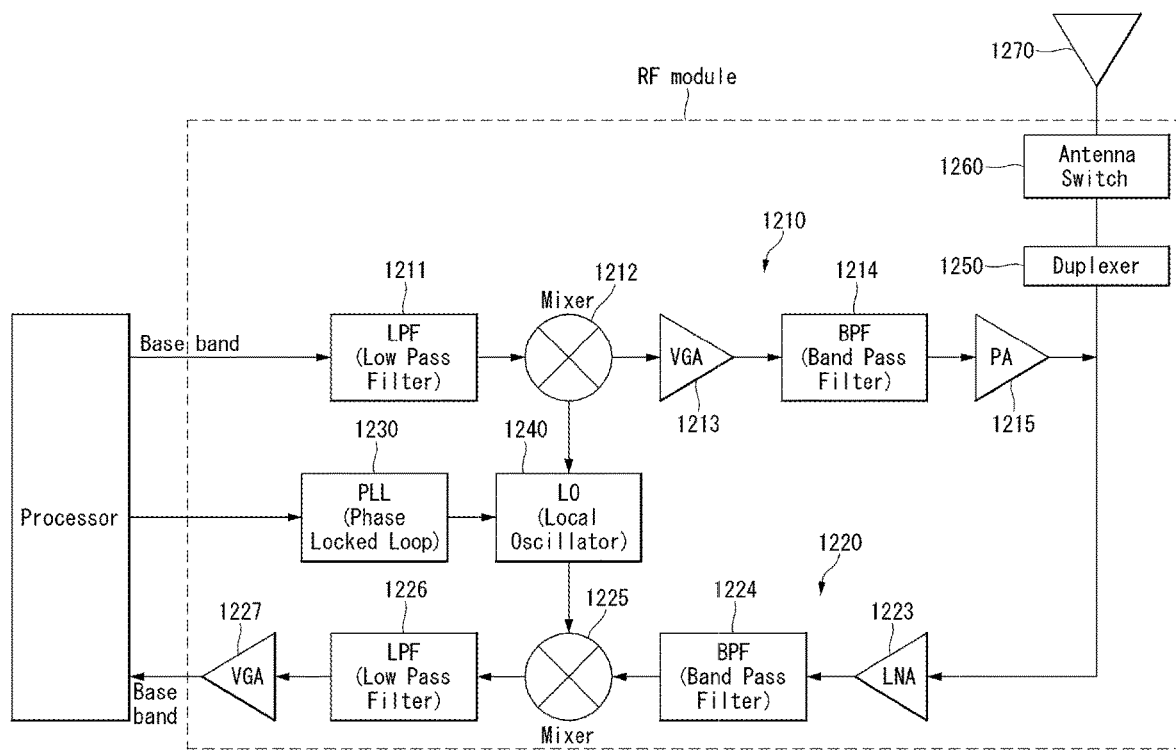
FIG. 12 illustrates an example of a RF module of a wireless communication device to which a method described in the present disclosure is applicable.

FIG. 12 illustrates an example of a RF module of a wireless communication device to which a method described in the present disclosure is applicable.

More specifically, FIG. 12 illustrates an example of an RF module that can be implemented in a frequency division duplex (FDD) system.

First, in a transmission path, the processor described in FIGS. 10 and 11 processes data to be transmitted and provides an analog output signal to a transmitter 1210.

In the transmitter 1210, the analog output signal is filtered by a low pass filter (LPF) 1211 to remove images caused by a digital-to-analog conversion (ADC), is up-converted from a baseband to an RF by an up-converter (mixer) 1212, and is amplified by a variable gain amplifier (VGA) 1213. The amplified signal is filtered by a filter 1214, is additionally amplified by a power amplifier (PA) 1215, is routed through duplexer(s) 1250/antenna switch(es) 1260, and is transmitted through an antenna 1270.

Further, in a reception path, the antenna 1270 receives signals from the outside and provides the received signals, and the signals are routed through the antenna switch(es) 1260/duplexers 1250 and are provided to a receiver 1220.

In the receiver 1220, the received signals are amplified by a low noise amplifier (LNA) 1223, are filtered by a bans pass filter 1224, and are down-converted from the RF to the baseband by a down-converter (mixer) 1225.

The down-converted signal is filtered by a low pass filter (LPF) 1226 and is amplified by a VGA 1227 to obtain an analog input signal, and the analog input signal is provided to the processor described in FIGS. 10 and 11.

Further, a local oscillator (LO) generator 1240 generates transmitted and received LO signals and provides them to each of the up-converter 1212 and the down-converter 1225.

In addition, a phase locked loop (PLL) 1230 receives control information from the processor in order to generate the transmitted and received LO signals at appropriate frequencies and provides control signals to the LO generator 1240.

The circuits illustrated in FIG. 12 may be arranged differently from the configuration illustrated in FIG. 12.

Figure 13:
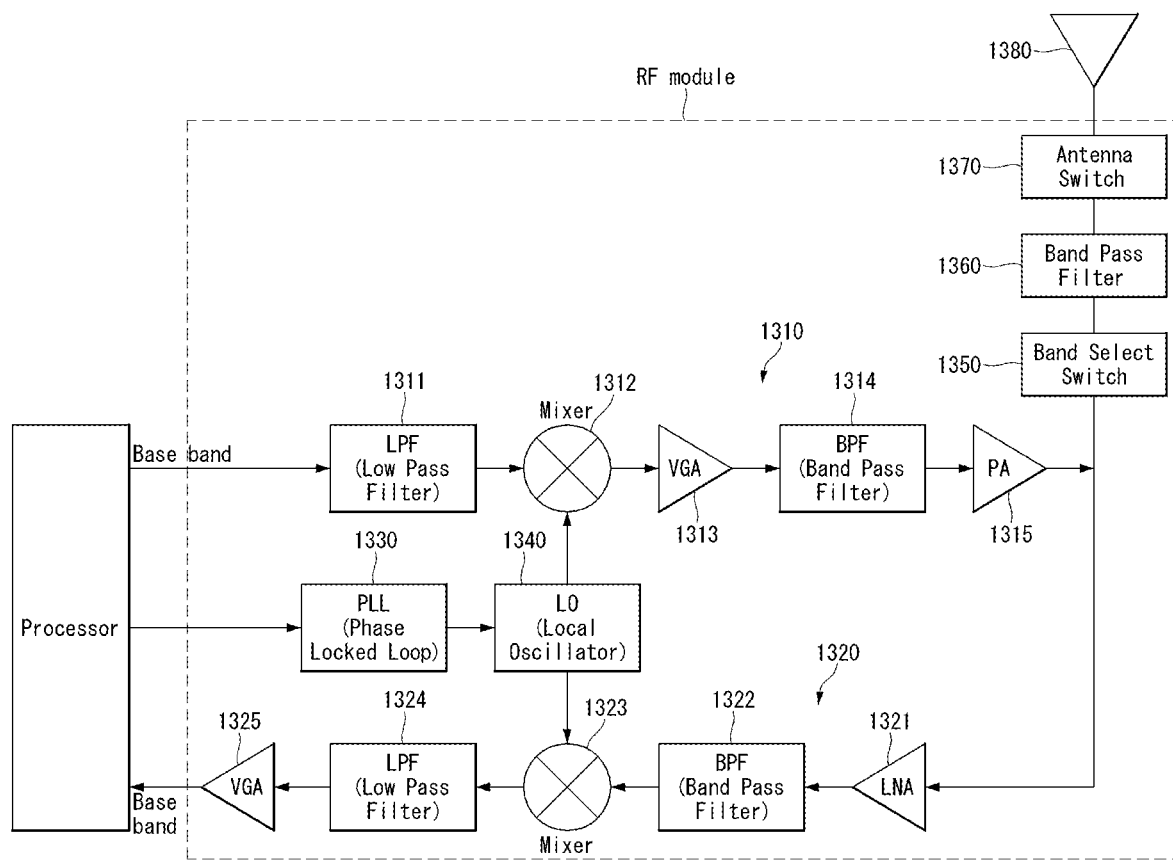
FIG. 13 illustrates another example of a RF module of a wireless communication device to which a method described in the present disclosure is applicable.

FIG. 13 illustrates another example of a RF module of a wireless communication device to which a method described in the present disclosure is applicable.

More specifically, FIG. 13 illustrates an example of an RF module that can be implemented in a time division duplex (TDD) system.

A transmitter 1310 and a receiver 1320 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 12.

A signal amplified by a power amplifier (PA) 1315 of the transmitter 1310 is routed through a band select switch 1350, a band pass filter (BPF) 1360, and antenna switch(es) 1370 and is transmitted via an antenna 1380.

Further, in a reception path, the antenna 1380 receives signals from the outside and provides the received signals, and the signals are routed through the antenna switch(es) 1370, the band pass filter 1360, and the band select switch 1350 and are provided to the receiver 1320.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although the present invention has been described focusing on examples applying to the 3GPP LTE/LTE-A/NR system, it can be applied to various wireless communication systems other than the 3GPP LTE/LTE-A/NR system.

The invention claimed is:

1. A method of transmitting, by a user equipment, an uplink signal using a carrier aggregation in a wireless communication system, the method comprising:

transmitting, to a base station (BS), a first uplink signal on a first component carrier (CC) included in a timing advance group (TAG), the first CC being based on a first subcarrier spacing (SCS); and transmitting, to the BS, a second uplink signal on a second CC included in the TAG, the second CC being based on a second SCS, wherein the first uplink signal and the second uplink signal are transmitted by applying a same timing advance (TA), wherein an adjustment unit of the TA is a TA granularity, and wherein the TA granularity is based on a largest SCS among the first SCS and the second SCS.

2. The method of claim 1, wherein a maximum uplink timing difference between the first uplink signal and the second uplink signal is determined based on a maximum subcarrier spacing, and wherein based on the maximum subcarrier spacing increasing N times, the maximum uplink timing difference is reduced to 1/N times.

3. The method of claim 2, wherein the maximum subcarrier spacing is set to a maximum value among subcarrier spacings supported in a specific frequency band, the wireless communication system, or a TAG.

4. The method of claim 2, further comprising:

transmitting, the BS, a third uplink signal on a third CC included in another TAG, wherein a TA granularity for the TAG and the another TAG is configured based on the maximum subcarrier spacing.

5. The method of claim 4, wherein each of the TAG and the another TAG is configured with a single numerology or multiple numerologies.

6. The method of claim 5, wherein based on each of the TAG and the another TAG being configured with the single numerology, a maximum TA is configured for each subcarrier spacing.

7. The method of claim 6, wherein based on each of the TAG and the another TAG being configured with the multiple numerologies, a maximum TA in each TAG is configured based on a minimum subcarrier spacing.

8. The method of claim 1, wherein the TAG is a primary TAG (pTAG), and the another TAG is a secondary TAG (sTAG).

9. The method of claim 1,
wherein a maximum value of the TA is based on a minimum SCS among the first SCS and the second SCS.

10. A method of receiving, by a user equipment, a downlink signal using a carrier aggregation in a wireless communication system, the method comprising:
receiving, from a base station (BS), a first downlink signal on a first component carrier (CC) included in a timing advance group (TAG), the first CC being based on a first subcarrier spacing (SCS); and
receiving, from the BS, a second downlink signal on a second CC included in the TAG, the second CC being based on a second SCS,
wherein the first downlink signal and the second downlink signal are received by applying a same timing advance (TA),
wherein an adjustment unit of the TA is a TA granularity, and
wherein the TA granularity is based on a largest SCS among the first SCS and the second SCS.

11. The method of claim 10, wherein the first downlink signal is a downlink control signal, and the second downlink signal is downlink data.

12. The method of claim 10,
wherein a maximum value of the TA is based on a minimum SCS among the first SCS and the second SCS.

13. A user equipment (UE) configured to transmit an uplink signal using a carrier aggregation in a wireless communication system, the UE comprising:
at least one transceiver configured to transmit and receive a radio signal; and
at least one processor functionally connected to the at least one transceiver,
wherein the at least one processor is configured to:
transmit, to a base station (BS), a first uplink signal on a first component carrier included in a timing advance group (TAG), the first CC being based on a first subcarrier spacing (SCS); and
transmit, to the BS, a second uplink signal on a second CC included in the TAG, the second CC being based on a second SCS,
wherein the first uplink signal and second uplink signal are transmitted by applying a same timing advance (TA),
wherein an adjustment unit of the TA is a TA granularity, and
wherein the TA granularity is based on a largest SCS among the first SCS and the second SCS.

14. The UE of claim 13,
wherein a maximum value of the TA is based on a minimum SCS among the first SCS and the second SCS.

\* \* \* \* \*